United States Patent [19]
Fishman

[11] Patent Number: 6,046,832
[45] Date of Patent: Apr. 4, 2000

[54] SYSTEM AND METHOD FOR PROTECTION OF WDM/SONET NETWORKS

[76] Inventor: Ilya M. Fishman, 558 Cambridge Ave., Palo Alto, Calif. 94306

[21] Appl. No.: 08/984,985

[22] Filed: Dec. 4, 1997

[51] Int. Cl.[7] .................................................. H04B 10/20
[52] U.S. Cl. ............................ 359/119; 359/110; 359/124
[58] Field of Search .................................... 359/110, 119, 359/124; 370/907, 535

[56] References Cited

U.S. PATENT DOCUMENTS

| | | | |
|---|---|---|---|
| 5,442,623 | 8/1995 | Wu .......................................... | 370/16.1 |
| 5,647,035 | 7/1997 | Cadeddu et al. ........................... | 385/24 |
| 5,757,768 | 5/1998 | Goto et al. ................................ | 370/222 |
| 5,982,517 | 11/1999 | Fishman .................................... | 359/119 |

*Primary Examiner*—Leslie Pascal
*Assistant Examiner*—Hanh Phan
*Attorney, Agent, or Firm*—Bella Fishman

[57] ABSTRACT

An architecture for mixed SONET/WDM networks using one dedicated protection ring for protection of several WDM links deployed along the same SONET ring by providing optical switching equipment for switching telecommunication traffic from working optical fibers of failed WDM links to protection optical fibers of the dedicated SONET ring selected for that purpose from the plurality of SONET rings of the mixed SONET/WDM network.

16 Claims, 7 Drawing Sheets

SYSTEM AND METHOD FOR PROTECTION OF WDM/SONET NETWORKS

BACKGROUND OF THE INVENTION

The present invention relates to the optical fiber telecommunication networks, and more particularly, to the technique of service protection and failure restoration of mixed networks comprising Synchronous Optical NETwork (SONET) rings and multiple Wavelength Division Multiplexing (WDM) point-to-point links. WDM systems carrying many independent traffic channels (8/16/32 and more) over the same fiber are currently widely deployed. These systems allow to upgrade the network capacity without using additional fiber. However, the point-to-point WDM links have no built-in mechanisms for service protection (restoration) in case of fiber or cable cut. For protection purposes, WDM links currently employ the algorithms of fiber and equipment protection acquired from SONET rings.

The conventional mixed SONET/WDM networks are not adequately protected against cable cuts. When cable is cut (working and protection fibers are broken), all SONET rings passing through the broken WDM link have to switch independently. Thus, the local failure propagated across the network causing, for the number of channels over 16, traffic perturbation on a national scale. To develop adequate protection, it was suggested by the inventor of the subject patent application in the U.S. patent application Ser. No. 08/867,346 "Method and System for Service Restoration in Optical Fiber Communication Networks" to use optical switching technology to switch WDM traffic from failed WDM link to a dedicated protection ring (DPR). The dedicated protection ring was selected from the plurality of SONET rings passing through the WDM link. Optical switches deployed at transmitting and receiving WDM nodes switched WDM traffic from working fibers of WDM link to protection fibers of the dedicated protection ring.

The rapid growth of network capacity results in significant fraction of the networks being populated by WDM links. In many cases, one SONET ring comprises several WDM links. These WDM links may be adjacent to each other and have different capacity. It was shown in the aformentioned U.S. patent application '346 that for these more complicated SONET/WDM configurations, one or more dedicated protection rings may be used. However, with the increased density of WDM links, the dedicated protection rings would overlap, and network architecture will become complicated and vague.

It is therefore desirable to provide the network architecture for protection of mixed SONET/WDM networks with adjacent and multiple WDM links equivalent to SONET ring protection and sufficient for required network reliability.

SUMMARY OF THE INVENTION

In view of the forgoing, it is a general object of the present invention to provide a system and method for protection of mixed SONET/WDM network with multiple WDM links. This object is achieved, in accordance with the present invention, in a systematic approach developed for protection of mixed WDM/SONET networks with multiple WDM links by using a compound system of the optical switches for rerouting WDM and SONET traffic via protection fibers when working fibers fail.

It is an advantage of the present invention that the same DPR may be used for protection of several WDM links deployed along the SONET ring.

It is a further advantage of the present invention that WDM links protected by the same DPR may have different capacity.

It is a further advantage of the present invention that the fiber (cable) and WDM equipment protection functionalities are implemented independently and complementary to SONET protection.

It is a further advantage of the present invention that the suggested protection architecture allows to reduce cost and potentially increase network reliability.

According to one aspect of the present invention, a protection system is provided for a mixed SONET/WDM network which comprises a plurality of SONET rings with a plurality of nodes with working and protection SONET equipment. Each SONET ring comprises at least three nodes that are interconnected by working and protection optical fibers. One ring selected from the plurality of SONET rings is dedicated for protection of SONET equipment in case of failure of the working optical fiber. The DPR also comprises WDM equipment for multiplexing and demultiplexing of the optical signals from SONET equipment for producing WDM traffic. The protection system further comprises two types of optical switching equipment: one for rerouting the WDM traffic from the failed working optical fiber to the protection optical fiber, and another one for reconfiguration of the nodes comprising WDM equipment within DPR for transmitting the WDM traffic through the protection optical fibers.

DPR may be populated by different number of nodes comprising WDM equipment. If each DPR node comprises WDM equipment, each such node is provided by working WDM terminals with corresponding number of protection WDM terminals for receiving and transmitting WDM traffic from WDM equipment and single wavelength traffic from SONET equipment. The number of the working WDM terminals should be even. Each respective WDM input and output of the working WDM terminal is connected to respective working and protection optical fibers via the rerouting optical switching equipment. Each protection WDM terminal comprises at least one WDM input or output and a plurality of single wavelength outputs or inputs. The single wavelength outputs of protection WDM terminals are connected to inputs of protection SONET equipment or to single wavelength inputs of protection WDM terminals via the reconfiguration optical switching equipment.

If two adjacent DPR nodes comprise at least one working WDM terminal within each node, the working WDM terminal has one WDM input or one output for receiving or transmitting WDM traffic respectively, and a plurality of outputs or inputs for transmitting or receiving SONET traffic respectively. The WDM input and output of this at least one working WDM terminal carrying WDM traffic are connected to the working or protection optical fibers via the rerouting optical switching equipment. Each DPR node comprising WDM working terminal, further comprises a WDM equipment protection switch having one common port and a plurality of switching ports, wherein the common port is connected to the protection optical fiber, and each switching port is connected to respective input or output of the protection SONET equipment. Each DPR node that does not comprise WDM equipment further comprises two reconfiguration optical switches for bypassing WDM traffic through this node along a protection path, and an optical amplifier for amplifying WDM signals. The length of the protection optical path in this case should be equal to or less than maximum reach of the WDM equipment (maximum distance that WDM traffic can travel without optical to electronic conversion). If the length of a protection optical path exceeds maximum reach of the WDM equipment, then each DPR node that does not comprise WDM equipment comprises two reconfiguration optical switches and a WDM repeater for regeneration (demultiplexing, optical-to-electronic and electronic-to-optical conversion, and multiplexing) WDM traffic.

In accordance to the methods embodying the present invention, by which the above and other objects and advantages may be accomplished in mixed SONET/WDM network, WDM equipment and working fibers (WDM links) connecting the nodes with such equipment are protected by selecting one ring equipped with working WDM equipment from the SONET rings of the network to be a DPR; and providing this DPR with the nodes having two types of optical switching equipment for rerouting the WDM traffic from failed working optical fibers to protection optical fibers, and optical switching equipment for reconfiguration (bypassing SONET equipment) for the nodes not adjacent to the failed WDM link.

The adequate method of protection of working WDM equipment is chosen depending on the DPR population by working WDM equipment. If a majority of the DPR nodes comprise working WDM equipment, each working terminal of the WDM equipment is accompanied with a protection WDM terminal, and each node is provided with optical switching equipment. The WDM traffic is rerouted via the optical switching equipment from failed working optical fiber to the protection optical fiber. The protection WDM terminals of each node is reconfigured within a protection path of the switched WDM working traffic by switching transmitting protection WDM terminals from protection SONET equipment to receiving protection WDM terminals utilizing optical switching reconfiguration equipment.

If a minority of DPR nodes (at least two adjacent nodes) are populated by WDM working equipment, the optical switching equipment is provided in the nodes comprising WDM equipment for rerouting the WDM traffic from failed working optical fiber to the protection optical fiber. At DPR nodes which do not comprise WDM equipment, bypassing SONET equipment by WDM traffic is achieved through additional switching equipment and optical amplifiers or WDM repeaters. The protection of the working WDM equipment is provided by additional switching equipment which switches failed single wavelength SONET traffic to a protection optical fiber.

The other objectives and advantages of the present invention are accomplished by providing optical switching technology for switching telecommunication traffic from working fibers of failed WDM links to protection fibers of DPR. Protection fibers of DPR are used for protection of WDM links (including optical amplifiers) and protection of WDM equipment. For both purposes, DPR protection fibers are equipped with optical switches and optical amplifiers and/or WDM repeaters.

The foregoing and other objects, features and advantages of the present invention will become apparent from the following detailed description of the preferred embodiment taken together with the accompanying drawings.

DESCRIPTION OF THE PREFERRED EMBODIMENTS

According to the present invention, service restoration for multiple WDM links in mixed WDM/SONET network is provided in cases of fiber (cable) cuts and WDM equipment failures. When fiber or cable is cut in one of WDM links, a protection system switches WDM traffic from failed working fiber to a protection fiber of a dedicated WDM/SONET ring. Depending on the DPR population by WDM equipment and the DPR loss caused by fiber length or other sources of loss, optical amplifiers or WDM repeaters may be used to regenerate the signal along the alternative DPR route (path). For WDM equipment protection, failed WDM channel is switched to the protection link fiber on 1:N basis. For networks implemented in a 4-fiber SONET ring architecture, the present invention allows to retain or enhance conventional level of protection provided by SONET rings.

Figure 1:
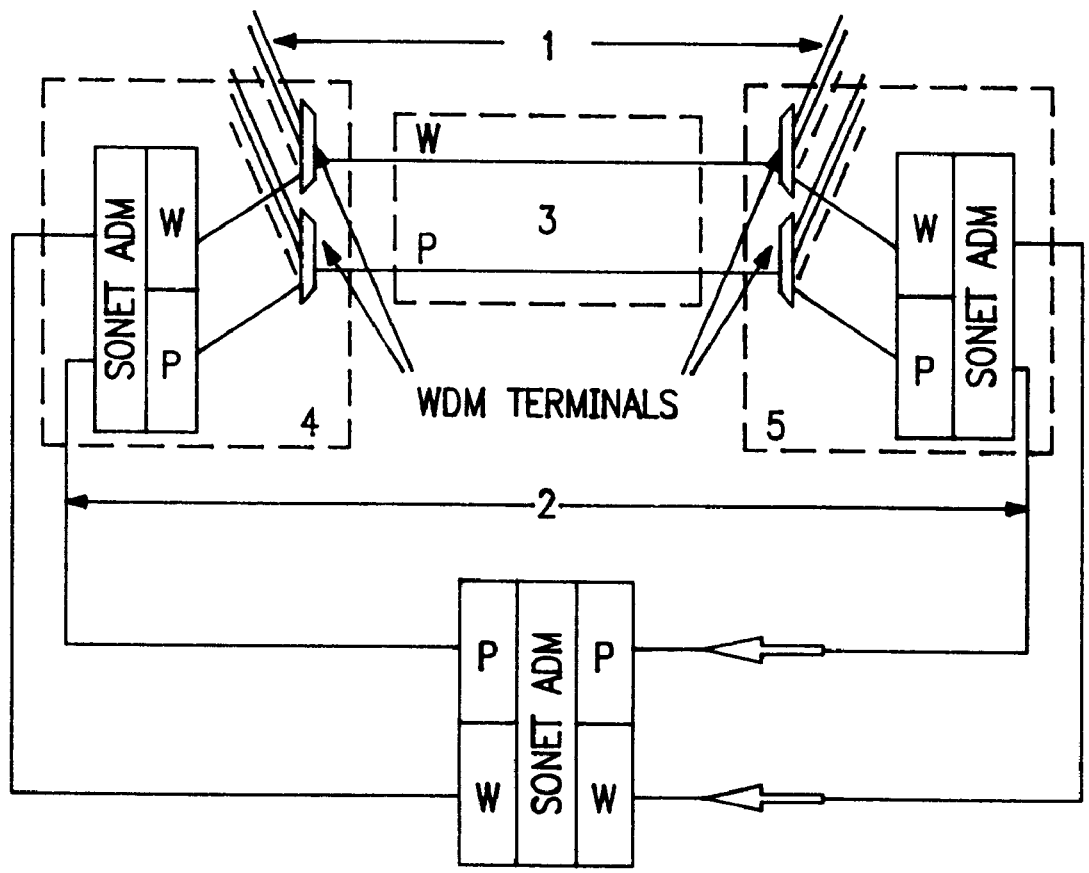
FIG. 1 shows a schematic diagram of conventional protection architecture of a mixed WDM/SONET network with one WDM link.

The prior art concept of service restoration for a WDM link in mixed WDM/SONET network is schematically shown in FIG. 1 where a plurality of SONET rings 1 and a DPR 2 share WDM link 3. Normally, WDM traffic flows along two parallel paths, the upper working (w) fiber and lower protection (p) fiber of WDM link 3. Discrimination between the working and protection signals is provided after demultiplexing WDM traffic by WDM terminals at respective nodes 4 and 5, by SONET working (W) and protection (P) receiving add-drop multiplexers (ADM). Thus, the protection capabilities of the existing WDM/SONET networks is equivalent to protection capabilities of SONET rings.

The drawback of the prior art protection architecture is that, in case of cable cut (both working and protection fiber fails), the WDM traffic is lost, and the protection capability is provided by SONET ring switch only. This protection, being appropriate for a single SONET ring, produces a wide-spread turmoil in the network if the number of rings combined in the WDM link is large.

Figure 2:
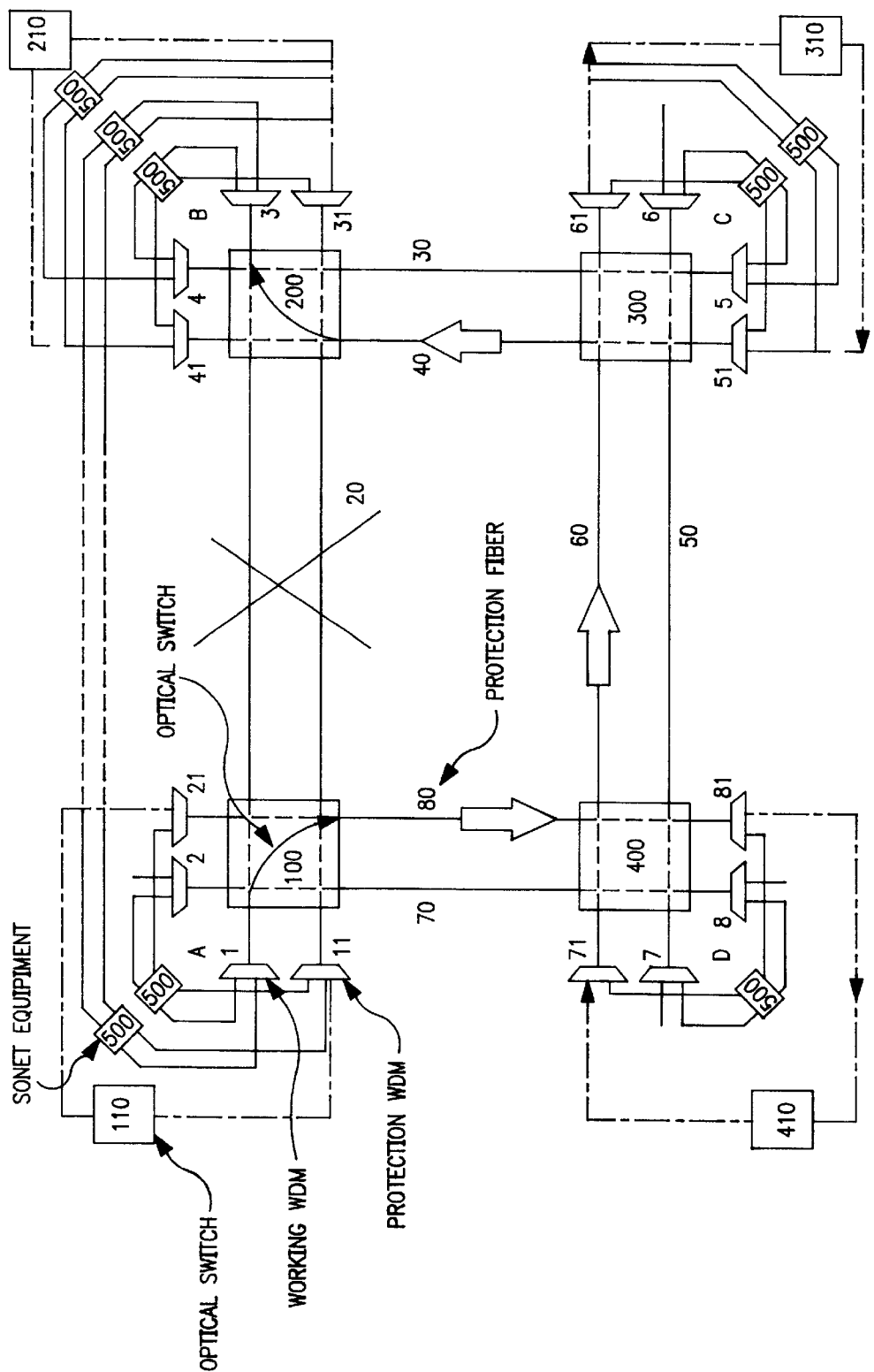
FIG. 2 shows a protection system of a mixed WDM/SONET network according to present invention when all DPR nodes comprise working WDM equipment.

The present invention provides a multilevel protection system for mixed SONET/WDM networks. Referring to FIG. 2, fiber and equipment connection is shown in a 4-node ring with working WDM equipment 1 and 2, 3 and 4, 5 and 6, 7 and 8, and protection WDM equipment 11 and 21, 31 and 41, 51 and 61, 71 and 81, deployed at nodes A, B, C and D, respectively. Only two out of four fibers in a 4-fiber ring are shown, with working and protection traffic propagating in opposite directions. Rerouting optical switching system comprises rerouting optical switches 100, 200, 300 and 400 deployed at nodes A, B, C and D, respectively. The switch connection under normal conditions is shown by dashed lines and corresponds to conventional architecture of FIG. 1. Each WDM terminal has one WDM input or output connected to rerouting optical switch.

Reconfiguration optical switching equipment comprises reconfiguration optical switches 110, 210, 310 and 410 deployed at nodes A, B, C and D, respectively. Working WDM terminals have a plurality of single wavelength inputs (outputs) connected to working outputs (inputs) of SONET equipment 500. Protection WDM terminals have a plurality of single wavelength inputs (outputs) connected to outputs (inputs) of protection SONET equipment or to outputs (inputs) of other protection WDM terminals deployed at the same nodes.

When link AB fails (both working fiber 10 and protection fiber 20 are cut), WDM working traffic is switched by rerouting switch 100 from terminal 1 of link AB to protection fiber 80 of link AD. At node D, this traffic is demultiplexed by a protection WDM terminal 81 and optically switched to protection WDM terminal 71 by reconfiguration optical switches 410. Normally, inputs (outputs) of protection WDM terminals are connected to outputs (inputs) of SONET equipment. Reconfiguration of WDM equipment by optical switches 410 converts receiving and transmitting protection WDM terminals into back-to-back WDM repeater as shown schematically by dash-dot lines in FIG. 2. From protection WDM terminal 71, WDM traffic is transmitted through protection fiber 60 to node C.

At node C, WDM traffic is demultiplexed by protection WDM terminal 61, optically switched to protection WDM terminal 51 by reconfiguration optical switches 310 and transmitted over protection fiber 40 to node B. At node B, WDM traffic is optically switched by rerouting optical switch 200 to WDM working receiving terminal 3 thus completing the bypass of WDM traffic over the protection route.

If cable cut occurs between other pair of nodes (for example, working fiber 30 and protection fiber 40 between nodes B and C fail), then the WDM traffic is rerouted from node B by rerouting switch 200 to protection fiber 20 to node A. At nodes A and D, protection WDM terminals 11,21 and 81, 71 are reconfigured by reconfiguration switches 110 and 410, respectively, to send WDM traffic through protection fibers 80 and 60. At node C, WDM traffic is rerouted to WDM terminal 5 by rerouting switch 300 thus completing the protection route.

Figure 3:
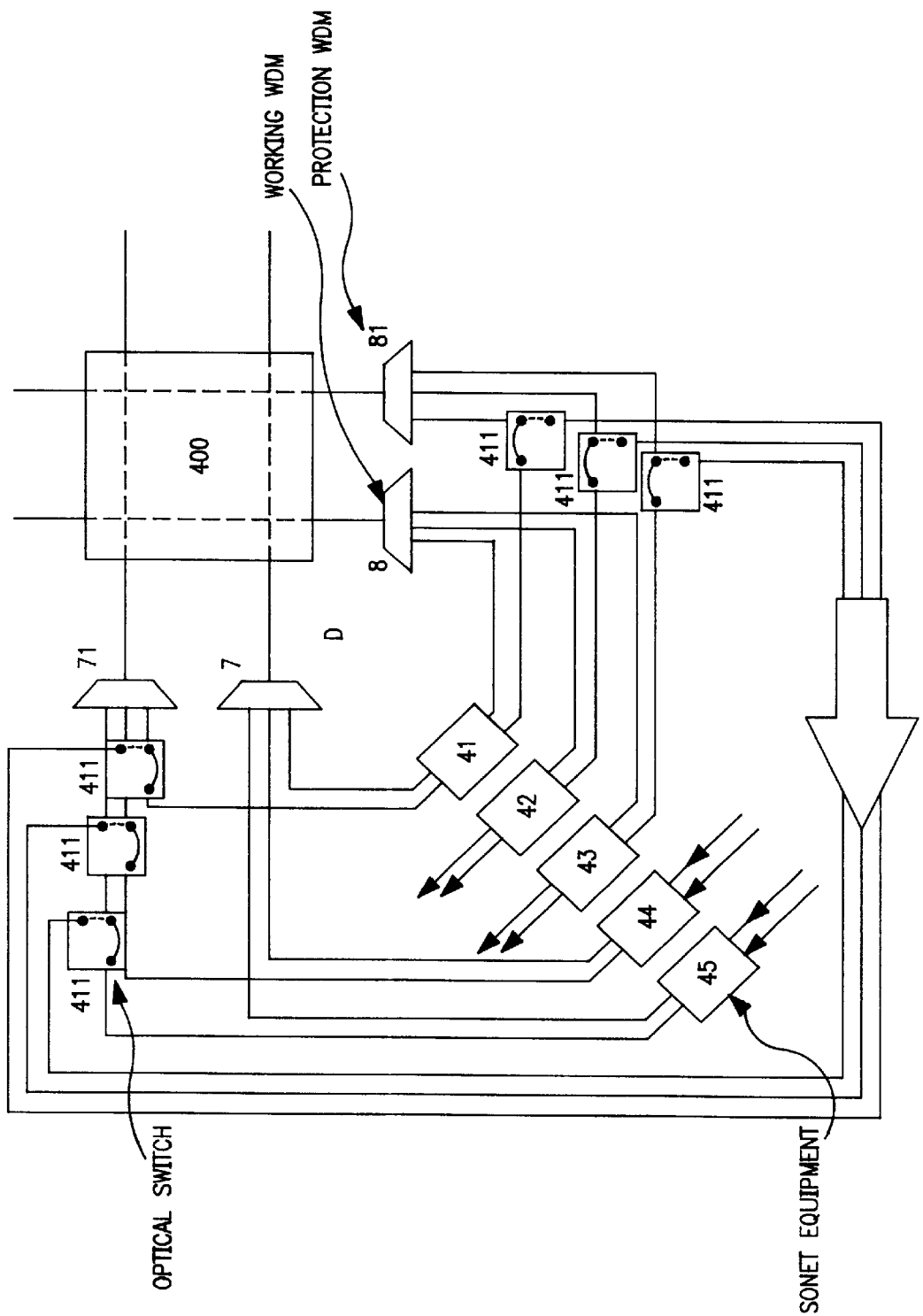
FIG. 3 shows an implementation of reconfiguration optical switching equipment in the protection system of FIG. 2.

Detailed configuration of one implementation of a reconfiguration switch is shown in FIG. 3. In normal conditions, 1×2 optical switches 411 are used to connect inputs or outputs of protection WDM terminals 81 and 71 with protection outputs or inputs of SONET equipment 41, 42, 43, 44, 45. For node D reconfiguration, switches 411 disconnect outputs of protection WDM terminal 81 from SONET equipment and connect them to inputs of protection WDM terminal 71 thus converting WDM terminals 81 and 71 into a back-to-back WDM repeater.

To distinguish whether rerouting, reconfiguration or WDM equipment protection switch should operate to achieve required network configuration a failure detection and control systems are provided. Failure detection system comprises optical power detectors installed at working fibers and at WDM terminal outputs. When WDM traffic is lost on working fiber, the optical power detector reports the power loss to the control system. The control system provides commands for the nodes adjacent to the fiber failure, to switch the rerouting switches, and to the other DPR nodes—to switch reconfiguration switches. When a single wavelength traffic is lost at one of WDM terminal outputs, a power detector reports the power loss to the control system, and the control system provides command to the WDM equipment protection switch to switch the failed WDM channel to the protection fiber. For node to node communication, SONET protocol or one of WDM channels may be used.

The capacity of working WDM links may be different along the DPR. The capacity of protection WDM links should be the same and equal to maximum WDM capacity of DPR links. The architecture of optically switched WDM/SONET ring shown in FIG. 2 and FIG. 3 presents a development of the WDM/SONET architecture of FIG. 1 for all-WDM rings. If the length of the protection path (links AD+DC+CB in FIG. 2) exceeds maximum reach of a WDM system, the embodiments of FIG. 2 and FIG. 3 or their equivalents which incorporate WDM max-demax and O-E conversion procedures, become the only viable solution. The architecture of FIGS. 2 and 3 retains all SONET protection capabilities, but is expensive because WDM equipment cost is doubled for providing protection capabilities only.

Figure 4:
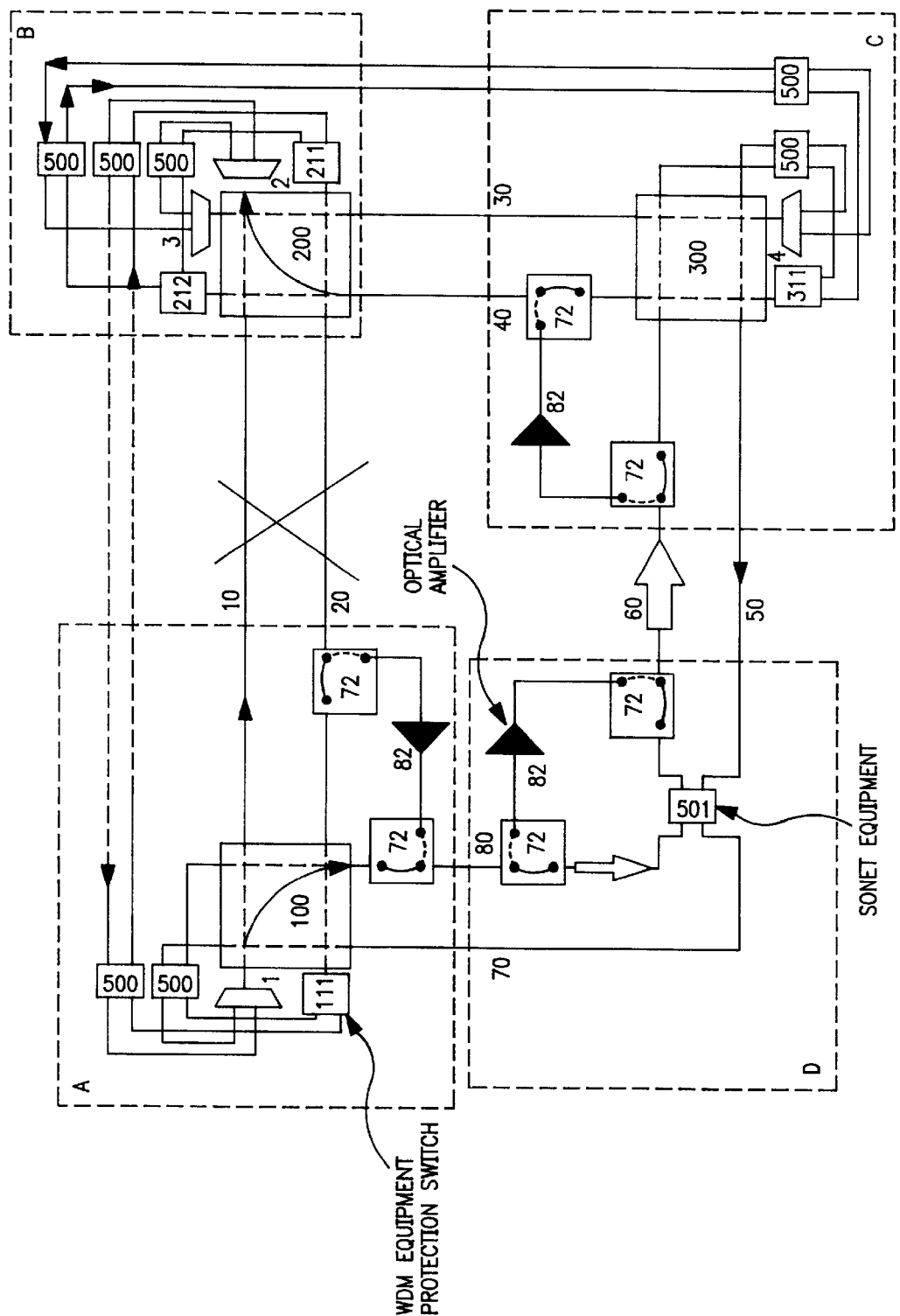
FIG. 4 shows the protection system of the present invention for a mixed WDM/SONET network with two adjacent WDM links and a protection path shorter than a maximum reach of WDM working equipment.

For WDM/SONET rings with low population of WDM equipment or for rings with a protection path shorter than maximum reach of a WDM system, the protection system should be modified as shown in FIG. 4. Referring to FIG. 4, fiber and equipment connection is shown in a 4-node DPR with nodes A, B, C, D; two adjacent WDM links AB and BC, and protection path AD+DC+CB shorter than maximum reach of a WDM system. Only two out of four fibers in a 4-fiber ring are shown, with working and protection traffic propagating in opposite directions. Working terminals 1 and 2, 3 and 4 are used to provide WDM traffic along WDM links AB and BC, respectively. Rerouting optical switches 100, 200 and 300 are used to reroute WDM traffic from failed working fiber to the protection DPR fiber. The rerouting switch connection under normal conditions is shown by dashed lines. At nodes A,C and D, reconfiguration optical switches 72 and optical amplifiers 82 are installed to carry WDM traffic along the protection path. The possibility to perform the WDM link protection in a mixed WDM/SONET ring of FIG. 4 with optical amplifiers 82 and simple 1×2 reconfiguration switches 72, presents significant advantages over the ring of FIG. 2 where two protection WDM terminals and complicated reconfiguration switching equipment 110–410 has to be installed for the same function. This advantageous architecture is plausible in rings with low population with WDM links.

At nodes with WDM equipment, WDM equipment protection switches are installed: 111 at node A, 211 and 212 at node B, and 311 at node C.

When WDM traffic between nodes A and B fails because of working fiber 10 cut, optical switch 100 switches WDM traffic to a protection fiber 80. At node D, WDM traffic bypasses SONET equipment 501 through optical switches 72 and optical amplifier 82, and directed through protection fiber 60 to node C. At node C, WDM traffic bypasses rerouting switch 300 through optical switches 72 and optical amplifier 82. At node B, WDM traffic is switched by optical switch 200 to the working WDM terminal 2 thus completing the protection path.

When WDM traffic between nodes B and C fails because of working fiber 30 cut, optical switches 200 and 300 switch WDM traffic along protection path BA+AD+DC through protection fibers 80, 60 and 40. The significant feature of the protection architecture of FIG. 4 is that, for both WDM links, AB and BC, the same DPR is used.

Working inputs or outputs of SONET equipment 500 are connected to single wavelength outputs or inputs of WDM terminals. Protection inputs or outputs of SONET equipment 500 are connected to protection fibers through WDM equipment protection switches. These switches provide 1:N protection of WDM equipment.

Figure 5:
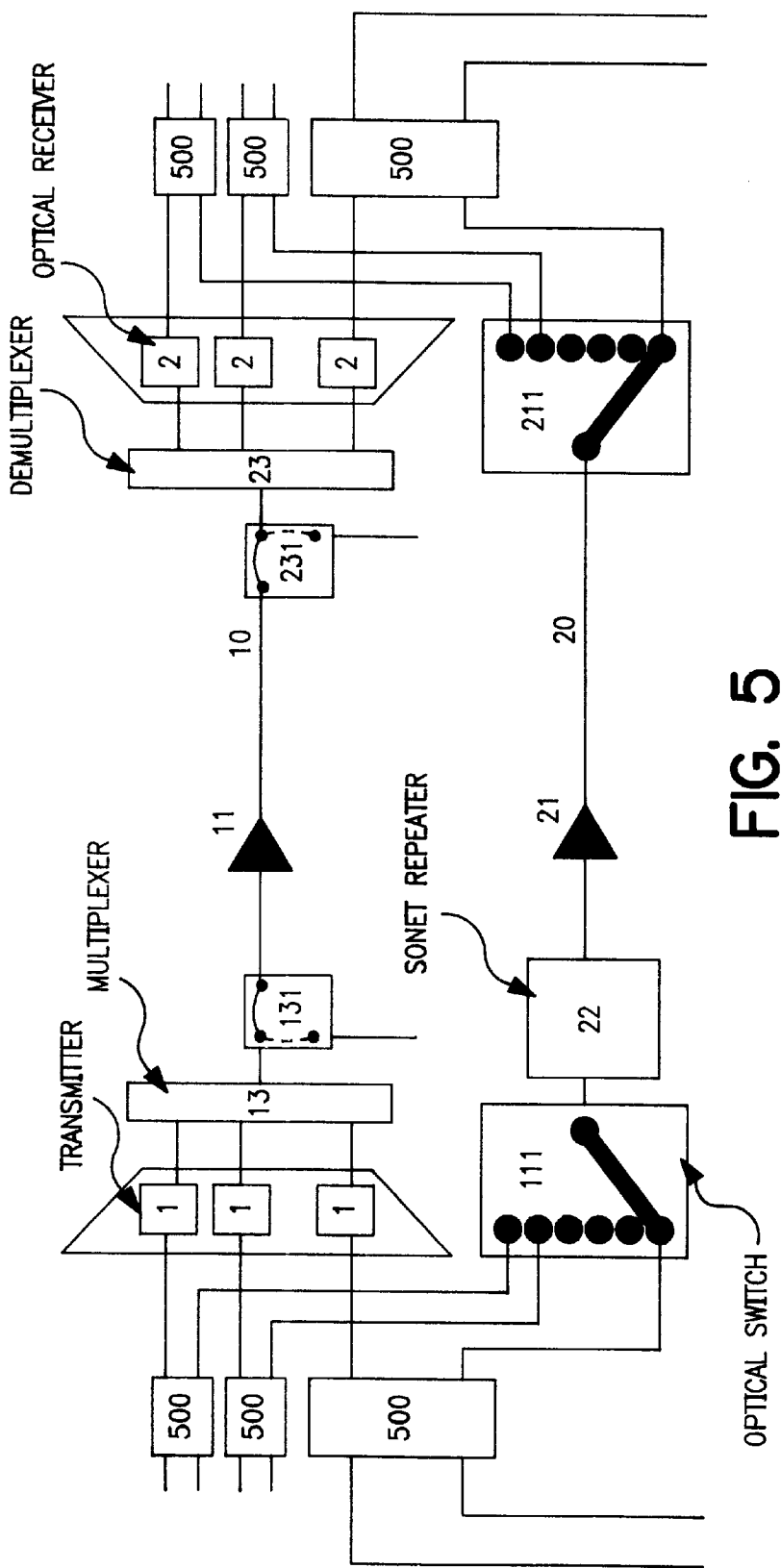
FIG. 5 shows an implementation of an optical protection system for protection of WDM equipment of the protection systems shown in FIG. 4 and FIG. 6.

FIG. 5 shows detailed diagram for a specific implementation of 1:N WDM equipment protection. In FIG. 5, outputs of working SONET equipment 500 are connected to inputs of WDM transmitters 1. Outputs of WDM transmitters are multiplexed by multiplexer 13 into WDM traffic send through rerouting optical switches 131 and 231, optical amplifier 11, working fiber 10 to WDM demultiplexer 23, WDM receivers 2 to inputs of SONET equipment 500. The outputs of protection SONET equipment are connected, through optical switch 111 and optical amplifier 21, to send a single wavelength protection traffic through protection fiber 20. At the receiving node, protection traffic passes through optical switch 211 to inputs of protection SONET equipment. When one of WDM transmitters 1 or receivers 2 fails, the respective SONET traffic is transmitted through the protection fiber 20. To compensate for optical power loss in optical switches 111 and 211 amplification by an optical amplifier 21 and regeneration by a SONET repeater 22 may be required. Using standard electronic equipment and passive switching devices in the protection channel makes overall probability of failure in 1:N approach comparable to 1+1 protection with two additional WDM terminals but offers significant costs savings.

The protection architecture of FIG. 4 is adequate for DPR with the protection path length not exceeding maximum reach of WDM system (for example, 600 km). If the protection path length exceeds maximum reach of WDM system, WDM repeaters may be used at one or more nodes along the protection path.

Figure 6:
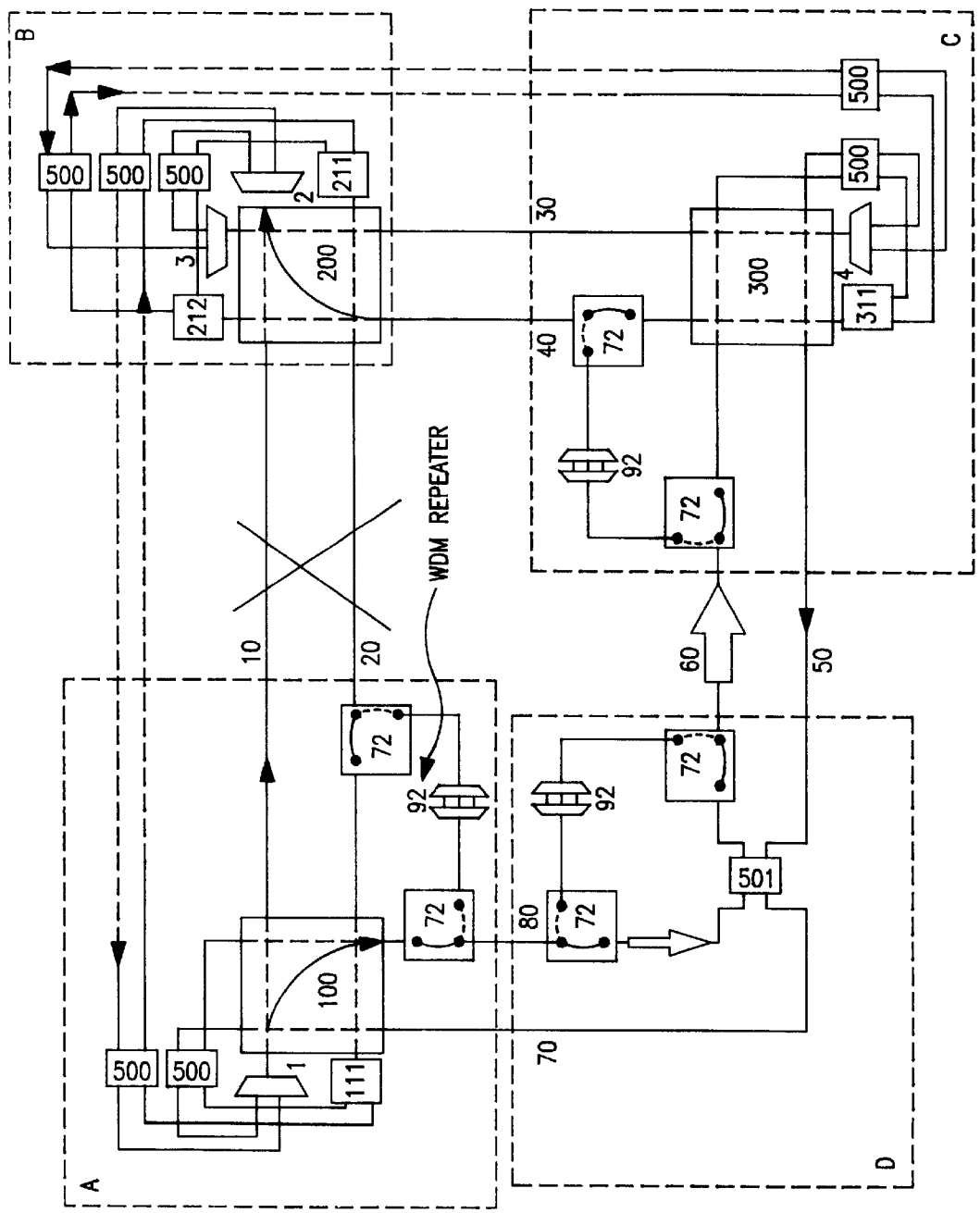
FIG. 6 shows the protection system of the present invention for a mixed WDM/SONET network with two adjacent WDM links and a protection path longer than a maximum reach of WDM working equipment.

Referring to FIG. 6, fiber and equipment connection is shown in a 4-node DPR with nodes A, B, C D, two adjacent WDM links AB and BC, and protection path AD+DC+CB longer than maximum reach of a WDM system. Fiber and equipment connections for DPRs of FIG. 6 and FIG. 4 are identical except using WDM repeaters 92 in the embodiment of FIG. 6 instead of optical amplifiers 72 in the embodiment of FIG. 4. In WDM repeaters 92, WDM receiving and transmitting terminals are permanently connected therebetween in a back-to-back manner which is more economical than deploying full WDM capability at the intermediate nodes.

Comparison of DPRs of FIG. 4 and FIG. 2 shows that the protection architecture should be chosen depending on the DPR population with WDM systems. Currently, WDM terminals are more expensive and less reliable than SONET and optical switching equipment. If all or almost all DPR links carry working WDM traffic, DPR with working and protection WDM terminals along each working and protection fiber are used. For DPRs with a small number of links carrying WDM traffic and short protection path, protection WDM terminals are not needed. With a full protection capability, the number of required WDM terminals per pair of fibers drops from 16 in FIG. 2 to 4 in FIG. 4, which provides significant costs saving with improved network reliability.

Figure 7:
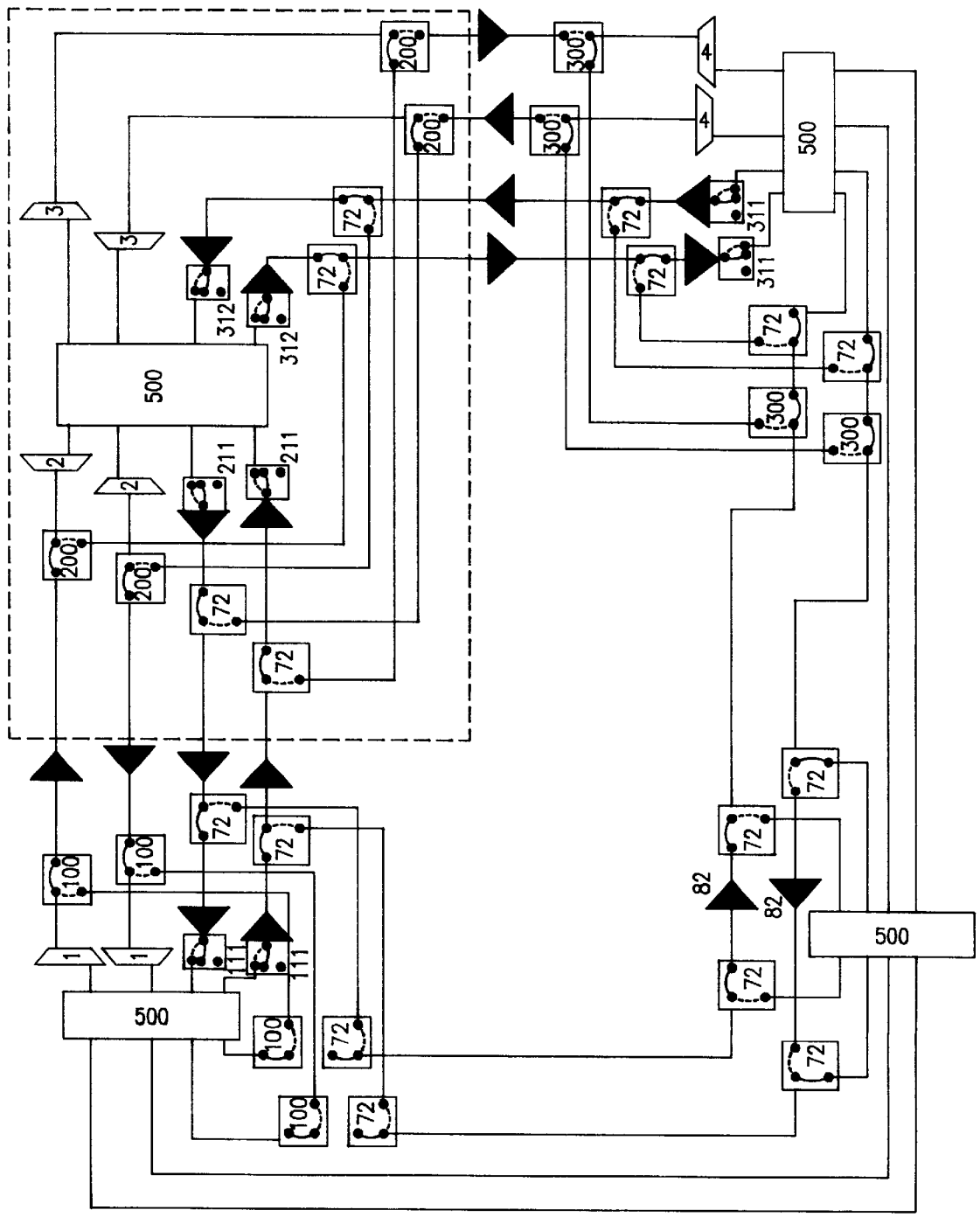
FIG. 7 shows a complete optical protection system for a 4-node 4-fiber mixed WDM/SONET network with two adjacent WDM links.

Referring to FIG. 7, detailed configuration of a 4-fiber DPR with two WDM links, fiber and 1:N WDM equipment protection is shown with optical amplifiers in the protection path. For a plurality of DPR configurations with more than two WDM links, and with the protection path length longer or shorter than the maximum reach of a WDM system, applicability of the architectures shown in FIGS. 2, 4 and 6 has to be analyzed on individual basis.

Though the method and protection architecture were developed for mixed SONET/WDM network, it can be used with other network architectures, for example, for 2-fiber rings or for ATM networks as well.

While there have been shown and described what are at present considered preferred embodiments of the present invention, it will be obvious to those skilled in the art that various changes and modifications may be made therein without departing from the scope of the invention as defined by the appended claims.

What is claimed is:

1. A protection system for a mixed SONET/WDM network comprising:
   a plurality of nodes, each said node comprising working and protection SONET equipment;
   a plurality of SONET rings, each said ring comprising at least three said nodes being interconnected by working and protection optical fibers;
   a dedicated protection ring (DPR) being selected from said plurality of SONET rings;
   WDM equipment for producing WDM traffic by multiplexing and demultiplexing of single wavelength optical signals forming SONET traffic from said SONET equipment;
   rerouting optical switching equipment for rerouting said WDM traffic from said working optical fibers to said protection optical fibers in case of failure of said working fibers; and
   reconfiguration optical switching equipment for reconfiguration of selected nodes of said DPR for transmitting said WDM traffic through said protection optical fibers, said selected nodes being connected to undamaged working fiber.

2. The protection system of claim 1, wherein each said node of said DPR comprises said WDM equipment.

3. The protection system of claim 2, wherein each said WDM equipment comprises working WDM terminals and a respective number of protection WDM terminals, each said working and protection WDM terminals having inputs and outputs for receiving and transmitting said WDM traffic, and inputs and outputs for receiving and transmitting said SONET traffic.

4. The protection system of claim 3, wherein the number of said working WDM terminals is even.

5. The protection system of claim 4, wherein the number of said working WDM terminals is two.

6. The protection system of claim 5, wherein each of said inputs and outputs of said working WDM terminals are connected to said working or protection optical fibers via said rerouting optical switching equipment.

7. The protection system of claim 6, wherein each said node further comprising at least two WDM protection terminals with a WDM input or output, and a plurality of single wavelength outputs or inputs, respectively, said single wavelength outputs being connected to inputs of said protection SONET equipment via said reconfiguration optical switching equipment, said single wavelength inputs and outputs being connected therebetween via said reconfiguration optical switching equipment for reconfiguration of said nodes which are connected to the undamaged optical fibers.

8. The protection system of claim 7, wherein said reconfiguration optical switching equipment comprises a plurality of reconfiguration optical switches, each said optical switch has at least two switching ports and one common port, said common port is connected to said protection WDM terminal, while said switching ports are connected to said SONET protection equipment and to another reconfiguration optical switch of said plurality of said reconfiguration optical switches.

9. The protection system of claim 1, wherein at least two adjacent nodes of said DPR are interconnected by said working and protection optical fibers, each said node comprising said WDM equipment.

10. The protection system of claim 9, wherein each said adjacent node comprises at least one said working WDM terminal, said at least one working WDM terminal having inputs and outputs for receiving and transmitting said WDM traffic, and inputs and outputs for receiving and transmitting said SONET traffic.

11. The protection system of claim 10, wherein said inputs and outputs of said at least one working WDM terminal are connected to said working or protection optical fibers via said rerouting optical switching equipment, and wherein the length of a protection optical path is not longer than maximum reach of said WDM equipment.

12. The protection system of claim 11, wherein each said adjacent node further comprising a WDM equipment switch which has one common port and a plurality of switching ports, said common port is connected to said protection optical fiber, and each switching port of said plurality of switching ports is connected to the corresponding input or outputs of said protection SONET equipment.

13. The protection system of claim 12, wherein said optical switching reconfiguration equipment comprises at least two 1×2 optical switches and an optical amplifier therebetween for rerouting said WDM traffic in case of failure of said working fiber and amplification of said rerouted WDM traffic.

14. A method for protection of a mixed SONET/WDM network formed by a plurality of SONET rings with a plurality of nodes interconnected by working and protection fibers, each said node having working and protection SONET equipment and a predetermined number of said nodes having working WDM equipment with transmitting and receiving terminals for providing WDM traffic by multiplexing or demultiplexing single wavelength traffic from SONET equipment, said method comprising the steps of:

selecting a dedicated protection ring (DPR) from said plurality of SONET rings with at least two nodes comprising WDM equipment therein;

analyzing said nodes of said DPR for determining the population of said DPR by said working WDM equipment;

providing a protection WDM terminal for each working WDM terminal when the majority of said nodes of said DPR are equipped with said working WDM equipment, each said protection WDM terminal having a capacity equal to maximum capacity of said working WDM terminal;

providing optical switching equipment within each said node of said DPR for rerouting said WDM traffic form failed working optical fiber to protection optical fiber;

providing optical switching equipment within each said node of said DPR for reconfiguration of said protection WDM terminals for switching working WDM traffic from said working fiber to said protection fiber; and reconfiguring protection WDM terminals within a path of said switched WDM working traffic by switching said transmitting protection WDM terminals from protection SONET equipment to said receiving protection WDM terminals.

15. A method for protection of a mixed SONET/WDM network formed by a plurality of SONET rings with a plurality of nodes interconnected by working and protection fibers, each said node having working and protection SONET equipment and a predetermined number of said nodes having working WDM equipment with transmitting and receiving terminals for providing WDM traffic by multiplexing or demultiplexing single wavelength traffic from SONET equipment, said method comprising the steps of:

selecting a dedicated protection ring (DPR) form said plurality of SONET rings with at least two nodes comprising WDM equipment therein;

analyzing said nodes of said DPR for determining the population of said DPR by said working WDM equipment;

rerouting said WDM traffic via optical switching equipment from failed working optical fiber to said protection optical fiber when the minority of said nodes of said DPR being equipped with said working WDM equipment; and bypassing SONET equipment via switching equipment when the working WDM traffic is switched to said protection fiber.

16. The method for protection of a mixed SONET/WDM network of claim 15, further comprising the steps of:

switching failed single wavelength SONET traffic to protection optical fiber via protection WDM switching equipment; and amplifying said switched or rerouted WDM traffic by optical amplifiers.

* * * * *